United States Patent [19]
Lopez-Aguado et al.

[11] Patent Number: 5,586,283
[45] Date of Patent: Dec. 17, 1996

[54] METHOD AND APPARATUS FOR THE REDUCTION OF TABLEWALK LATENCIES IN A TRANSLATION LOOK ASIDE BUFFER

[75] Inventors: Herbert Lopez-Aguado, Mountain View; Peter A. Mehring, Sunnyvale, both of Calif.

[73] Assignee: Sun Microsystems, Inc., Mountain View, Calif.

[21] Appl. No.: 132,796

[22] Filed: Oct. 7, 1993

[51] Int. Cl.$^6$ .................................................. G06F 12/10
[52] U.S. Cl. ................................................ 395/417; 395/416
[58] Field of Search ................................. 395/400, 416, 395/417

[56] References Cited

U.S. PATENT DOCUMENTS 5,426,750  6/1995  Becker et al. ........................ 395/417

*Primary Examiner*—Jack A. Lane
*Attorney, Agent, or Firm*—Blakely Sokoloff Taylor & Zafman

[57] ABSTRACT

A translation look aside buffer including virtual page table pointer tags provides a system and method for accessing page table entries in page memory of the translation look aside buffer with decrease latencies caused by accesses to increasing levels of page tables during a table walk of the page table. Virtual tags identifying page table pointers at a predetermined level of the page table higher than the initial context level of the page table are included in the tag memory of the translation look aside buffer. These virtual tags provide a pointer which directly points to the page table pointer at that predetermined level of the page table. Therefore, if a TLB miss occurs wherein a tag for a page table entry corresponding to the virtual address is not found, a comparison is performed to determined if a corresponding virtual tag PTP is located in the tag memory. If the corresponding virtual tag PTP is found in the tag memory, access is gained to the PTP in the page table without the need for performing a time consuming table walk through the lower levels of the page table.

18 Claims, 8 Drawing Sheets

TLB Tag Layout

PTE Layout in TLB RAM

PTP Layout in TLB RAM

METHOD AND APPARATUS FOR THE REDUCTION OF TABLEWALK LATENCIES IN A TRANSLATION LOOK ASIDE BUFFER

BACKGROUND OF THE INVENTION

1. Field of the Invention

The system of the present invention relates to computer memory management systems and more particularly to a method and apparatus for reducing latencies associated with table walks through translation look aside buffers in computer memory systems which utilize virtual memory addressing.

2. Art Background

A virtual memory system is one which allows addressing of very large amounts of memory, even though the main memory of the system encompasses a smaller address space. Virtual memory systems provide this capability by defining memory management units, in particular, pages or segments, have virtual memory addresses and corresponding physical memory addresses. A particular physical address may be in main memory or in slower alternate memory, such as disk space. If the physical address of the data is in main memory, the information is readily accessed and utilized. If the physical address indicates that the page is located in the alternate memory, the page is transferred or swapped to main memory, where the data can then be accessed. The transfer typically necessitates that other information be swapped out of main memory back to the alternate memory to make room for the new information. This is typically performed under the control of the memory management unit.

To increase the speed of virtual memory accesses, cache memories are also included to store recently used data and instructions. These caches are first accessed before accessing main memory for the information requested. These caches may be virtually addressed or physically addressed. However, cache memories accessed in accordance with the physical address necessitate the process of virtual to physical access translation prior to checking the cache as well as main memory.

The paging process, that is, the process of swapping pages, relies on a data structure that is indexed by the pages of memory. This data structure contains a physical address of the memory to be accessed according to the virtual address provided. This data structure containing the physical page addresses usually takes the form of a page table indexed by virtual page numbers, the size of the tables, the number of pages and the virtual address space. Page tables are usually so large that they are stored in main memory and are often paged themselves. This means that every memory access takes at least one or more times as long, as one memory access is needed to obtain the physical address and a second access is needed to obtain the data.

One technique used to minimize the cost of access time is to save the last translation performed so that the mapping process is skipped if the current address refers to the same page as the last one. In addition, to save additional time, advantage is taken of the principle of locality that is utilized for caches. If the references have locality, then the address translations for references must also have locality. By keeping these address translations in a special cache, a memory access rarely requires a second access to translate the address. This special address translation cache is referred to as a translation look aside buffer or "TLB". A TLB entry is like a cache entry wherein a tag portion holds portions of the virtual address and the data portion holds a physical page frame number, protection fields, use bits and a modified or dirty bit.

A number of different methods and techniques are available for increasing the speed of accesses to virtual memory. In one method, a more heavily pipelined memory access is utilized, wherein the TLB access is performed one step ahead of the pipeline. Another alternative is to match virtual addresses directly. Such caches are termed virtual caches. This eliminates the TLB translation time from a cache hit access situation. However, one drawback is that the process for table walk is quite time consuming and needs to be performed for each virtual address regardless of address locality.

Additional discussion on TLBs can be found in John L. Hennessey and David A. Patterson, *Computer Architecture, A Quantitative Approach*, (Morgan Kaufmann Publishing 1990), pages 432 to 461.

SUMMARY OF THE INVENTION

The system and method of the present invention provides for the performance of table walks in a translation look aside buffer (TLB) with reduced latency. A TLB typically includes multiple levels of entries. Each page table contains page table entries (PTEs) which provide physical address information, or page table pointers (PTPs), that point to a next level of entries in the page table which contains, for a particular virtual address, another PTP or a PTE. To determine the corresponding physical address, a table walk is performed sequentially through the levels of the page table to determine if the PTE is stored in the TLB starting at the root level. This time consuming process is performed for each virtual address.

In the present embodiment, the TLB comprises a three level page table in addition to the root or context table. Typically, PTPs for virtual memory addresses are found in the root, first and second levels of the page table and PTEs are found in the third level of the page table. In the system and method of the present invention, a virtual PTP tag is provided, which enables the direct access of the second level of the page table without prior accesses to the root and first level of the page table, thereby saving on the memory access time required to access those levels of the page table.

More particularly, the virtual PTP tag is a unique index generated using the context of the access and portions of the virtual address which is used to directly determine if the corresponding level two page table pointer is found in the page table. This minimizes the amount of time for performing a table walk through all the page tables by eliminating the need to walk through the root and first levels of the page table before accessing the second level of the page table.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

A translation look aside buffer (TLB) and mechanism for implementing the same in which virtual page table pointer tags are utilized to decrease the latency of accesses is described in the context of a preferred embodiment of a three level page table. However, it is readily apparent to one skilled in the art, from the following description, that other forms of TLBs and corresponding structures, such as TLBs containing a greater or lessor number of levels of page tables may be utilized to implement the concepts described herein.

On a translation miss, wherein the virtual address tag is not found in the tag memory of the TLB, the virtual address is translated into a corresponding physical address by "table-walking" or accessing a context table and typically one to three levels of page tables. The first and second levels of these tables typically, although not necessarily, contain page table pointers (PTP) to the next level table when memory accesses are performed. In the present embodiment, for purposes of illustration, a third level table entry contains a page table entry (PTE), which is used to generate the physical address. The table walk process for the virtual address uses the context table pointer register (CTPR) as a base register and the context number contained in the context register (CXR) as an offset to point to an entry in the context table. The context table entry is then used as a PTP to point to the first level page table and a first index field of the virtual address points to a specific location in the page table. The table walk hardware finds either a PTE, which terminates its search, or a PTP.

Each PTP is used in conjunction with a specified field in the virtual address to select an entry in the next level of tables. The table walk continues, searching through increasing levels of page tables, as long as PTPs are found pointing to the next level table. The table walk terminates when either a PTE is found or an exception is generated if a PTE is not found after accessing the maximum level page table.

Figure 1:
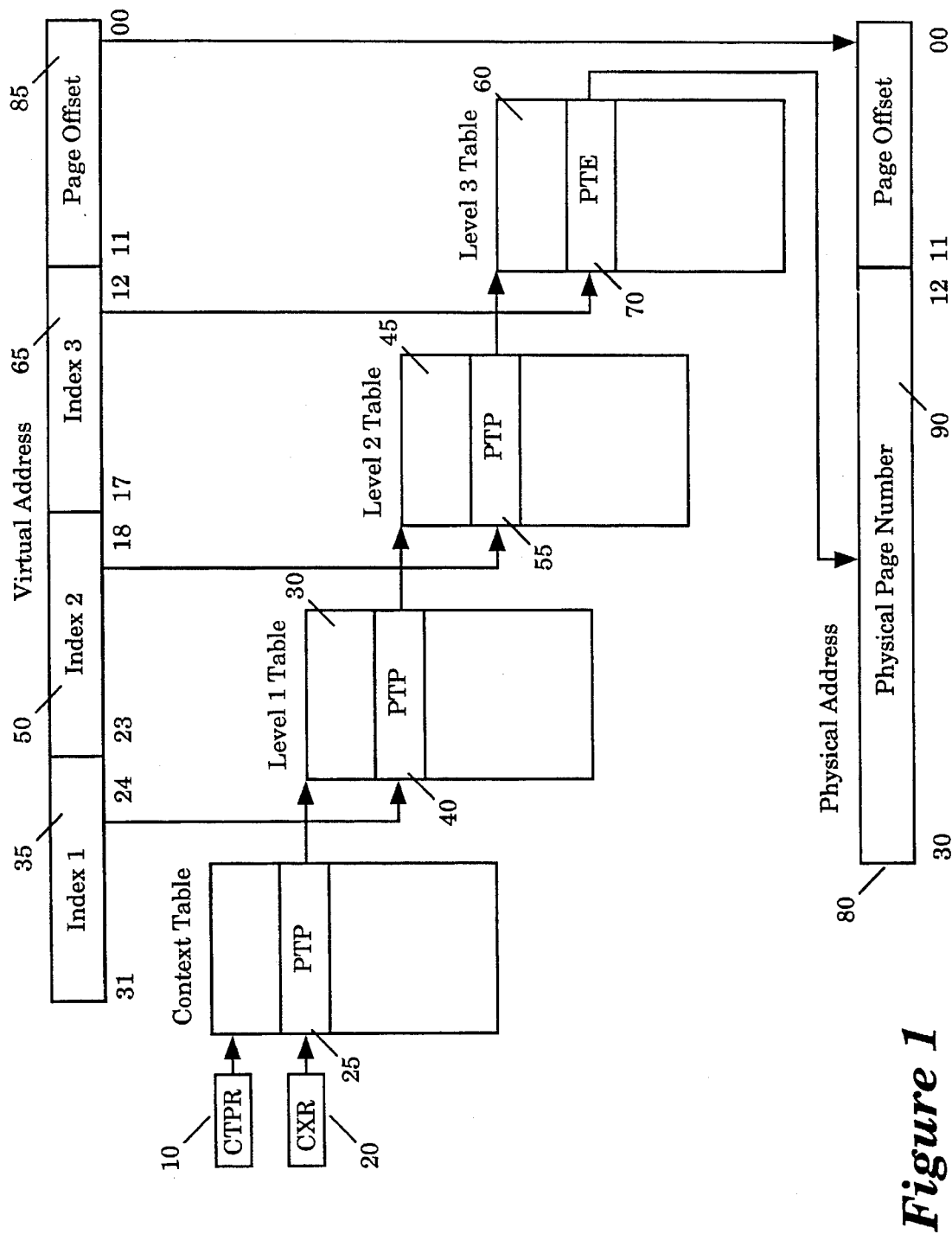
FIG. 1 is a diagram illustrating address translation using three levels and a root level of a page table.

A full table walk for three levels of a page table is illustrated by FIG. 1. The context pointer register (CTPR) 10 and the context register (CXR) 20 are utilized respectively to point to the context table and entry in the context table to access a first PTP 25 which points to the level one table 30. A first field 35 of the virtual address is used as an index into the level one table 30 to access the entry 40 in the table 30. In the present example, the entry 40 contains a PTP which points to the level two table 45. A second field 50 of the virtual address is used as an index into the level two table 45 to point to entry 55. As this entry is also a PTP, which points to the level three table 60, a third field 65 of the virtual address is used to index the entry 70 in the third level table 60. This entry 70 contains a PTE which provides a value utilized to complete the virtual to physical address translation to generate the physical address 80. In the present embodiment, the page offset field 85 from the virtual address is combined with the physical page number 90 stored in the PTE 70. Therefore, each table walk includes a number of different sequential accesses to sequential levels of page tables in order to construct the physical address.

It has been found that most PTEs are contained in the highest level of the table, in the present illustration, in the level three table, and that many accesses occur in locality with prior accesses. To take advantage of this, the present invention provides for virtually tagged PTPs for the level below which most PTEs are found, preferably the highest level containing PTPs. It is readily apparent that the present invention may be utilized to access any level higher than the root level in order to minimize the time required to perform a table walk. The virtual PTPs enable the direct access based upon the content and virtual address provided, without the need to go through the context table and lower level table walks. In the present embodiment, for a three level page table structure, level two virtual PTP tags are provided to directly access the level two PTPs, thereby avoiding the context and level one table walks. Preferably, the virtual tag for the PTP is generated from the context value found in the CXR register and the index fields from the virtual address used during table walks through the lower level tables. Thus, in the present embodiment, it is preferred that the tag be generated from the context value and index one and index two of the virtual address. If the virtual tag of the PTP is found in the TLB, there is no need to perform the context table and level one table walks. The level two PTP accessed in this manner may then be immediately used to perform an access to the PTE located in the level three page table. This process effectively reduces the table walk process from three memory accesses to one.

If the virtual tag PTP is not found in the TLB, then the MMU will initiate the table walk starting with the context table. As is known in the art, if during a table walk, entries are not found in the TLB, a read is performed from memory to provide the appropriate entries in the TLB. These entries are then cached or written to the TLB. Thus, subsequent accesses for the same entries are most likely to be found in the TLB.

Figure 2:
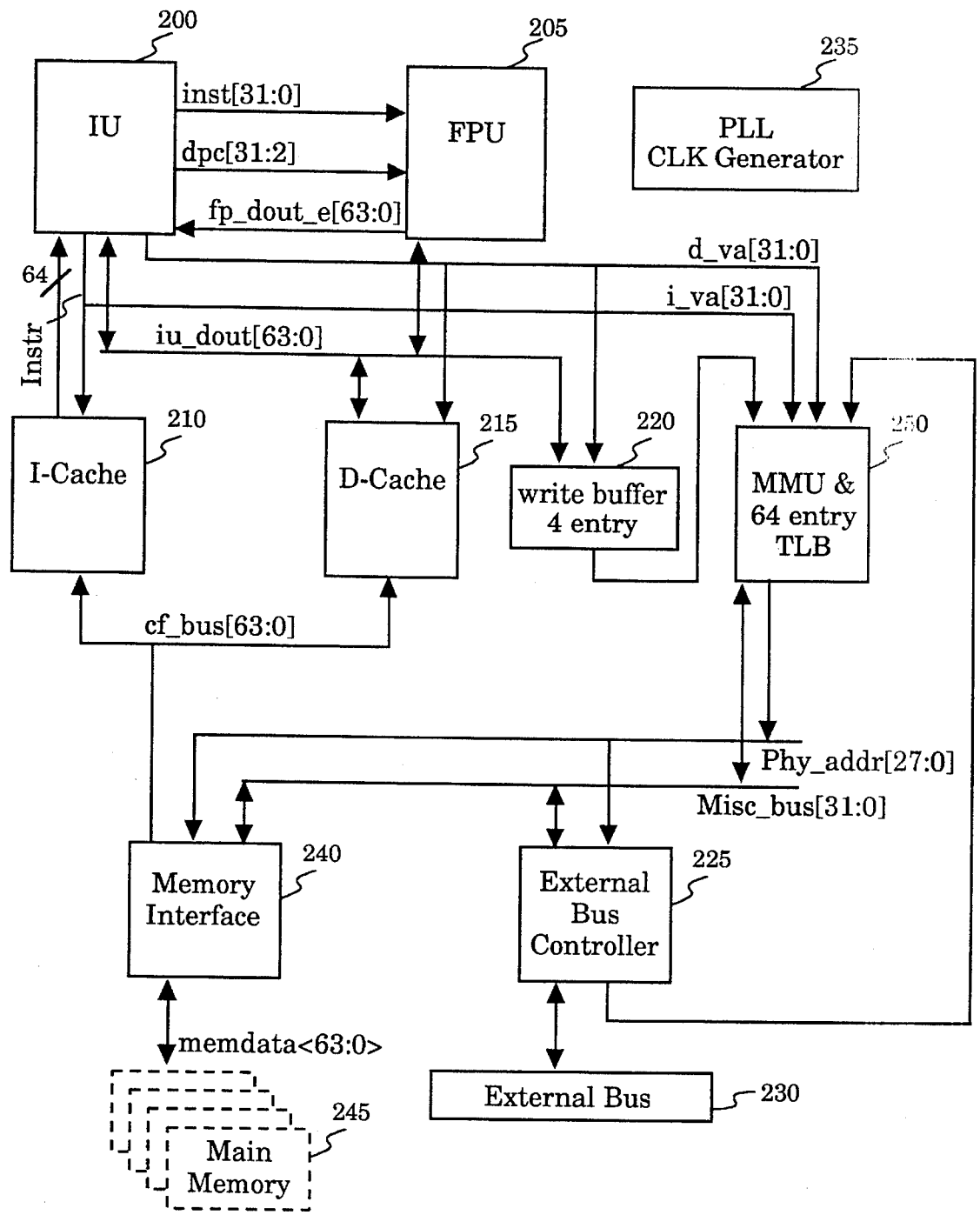
FIG. 2 is a block diagram of a processor including the memory management unit which incorporates the teachings of the present invention.

An exemplary system block diagram which utilizes the virtual tagged PTPs is illustrated by the block diagram of FIG. 2. It is readily apparent that this system is exemplary and other system structures may be utilized. Referring to FIG. 2, the system includes a number of elements including instruction unit 200, floating point unit 205, instruction cache 210, data cache 215, write buffer 220, external bus controller 225, which is coupled to an external bus 230, clock generator 235, memory interface 240, which interfaces main memory 245, and memory management unit 250, which includes the TLB in accordance with the teachings of the present invention.

Figure 3:
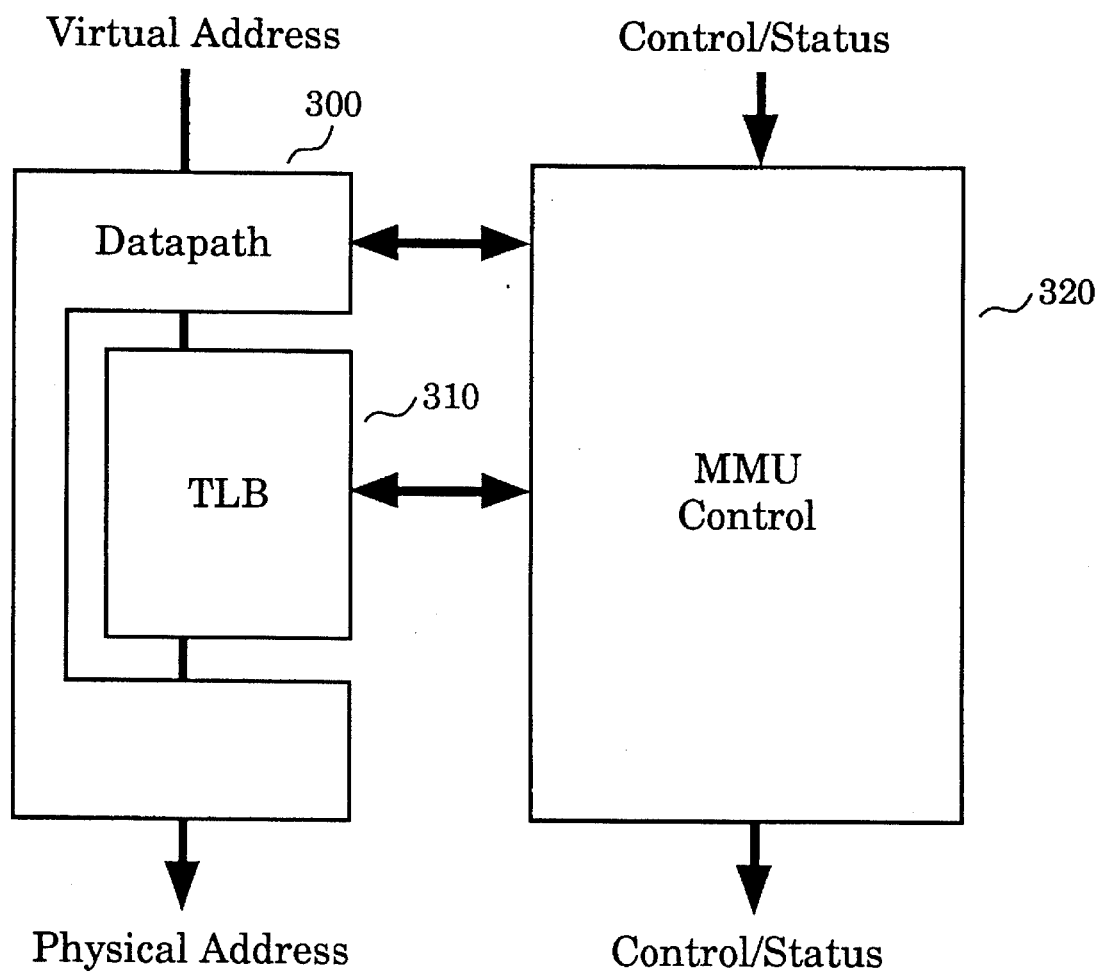
FIG. 3 is a block diagram of one embodiment of the memory management unit (MMU).
Figure 4A:
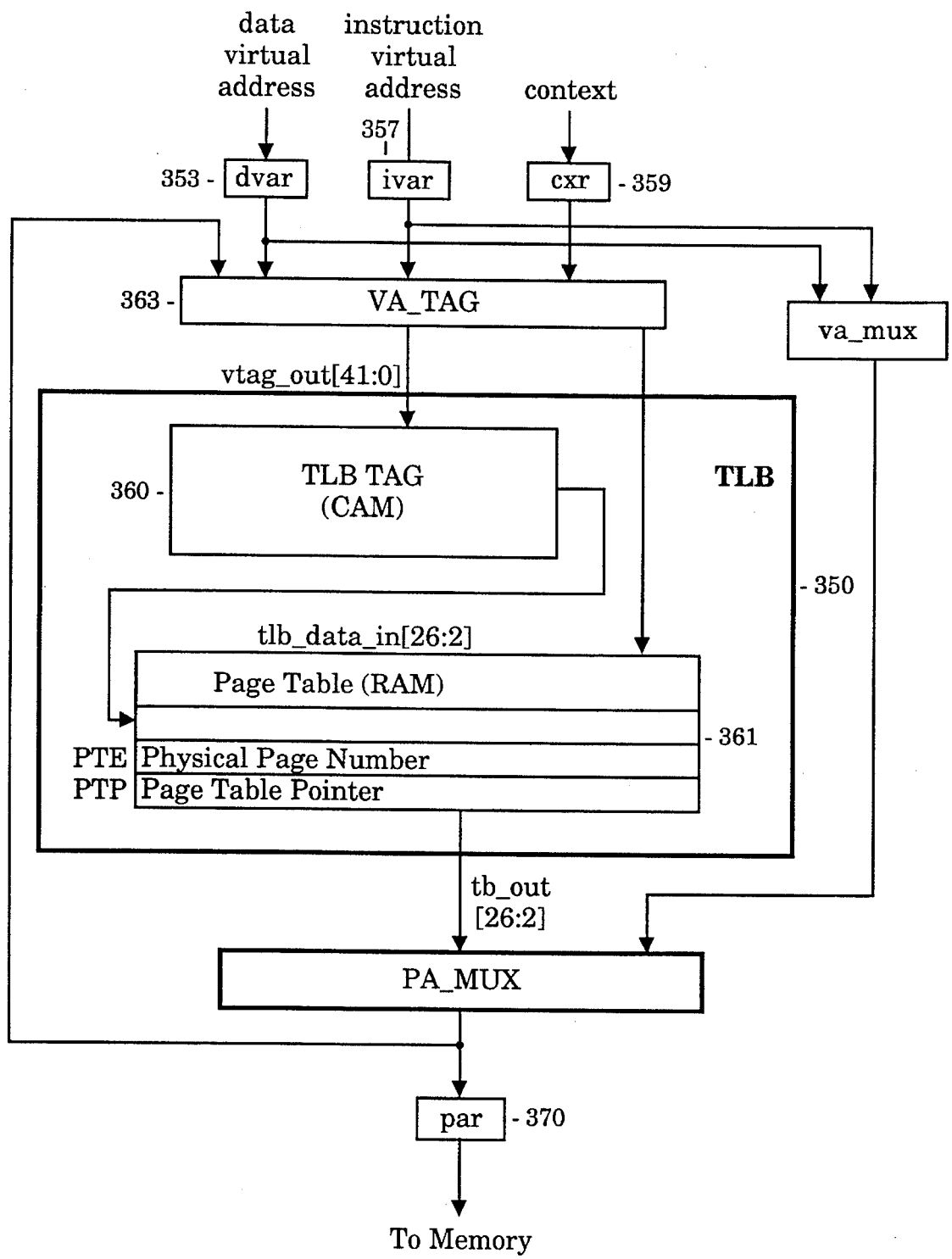
FIG. 4a and 4b are block diagrams illustrate the MMU data path and the translation look aside buffer (TLB), which operates in accordance with the teachings of the present invention.
Figure 4B:
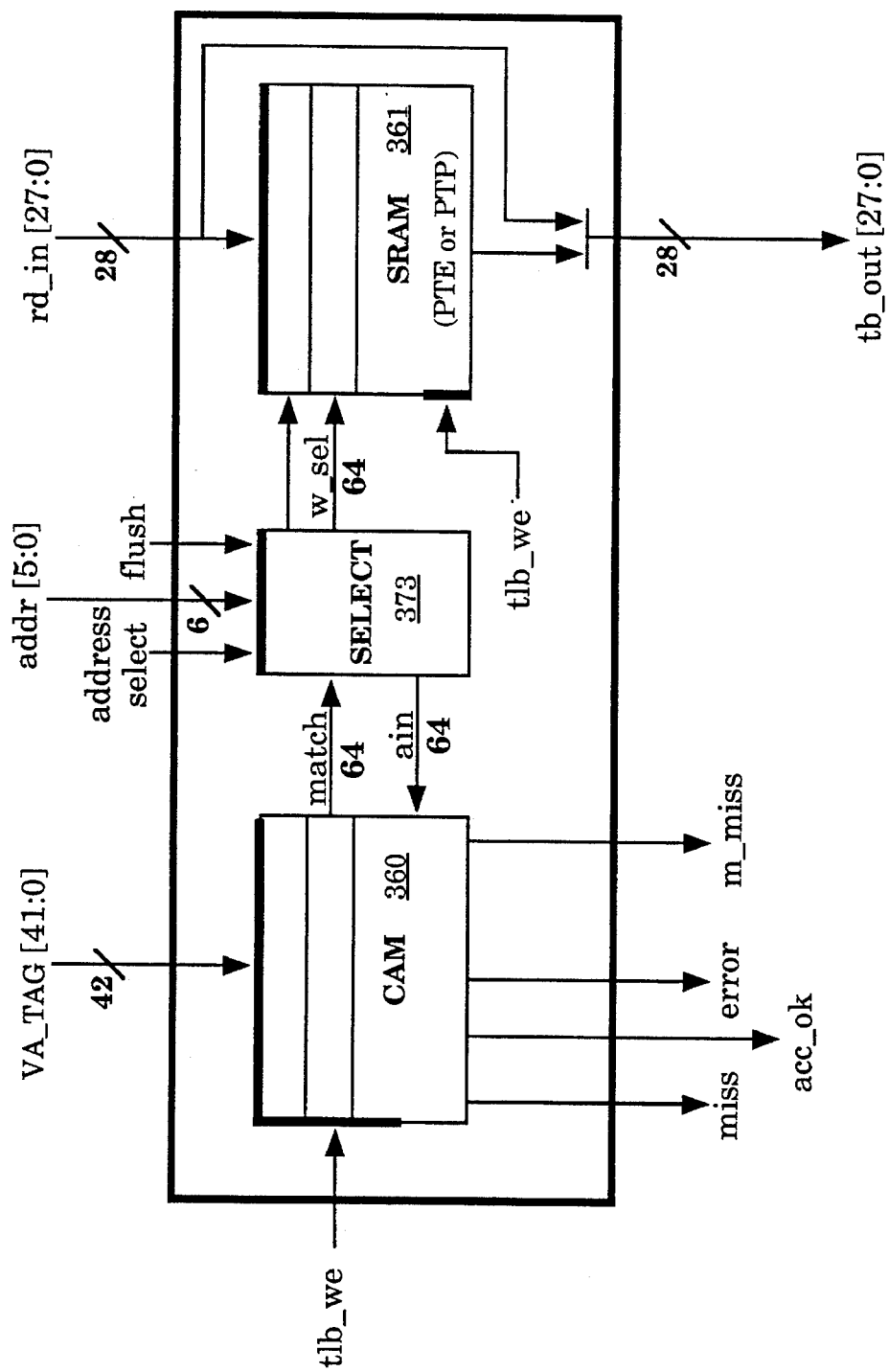

The memory management unit 250 can be said to be composed of three major blocks. This is illustrated by the block diagram of FIG. 3. The MMU comprises an MMU data path 300 translation look aside buffer 310 and controller 320. The MMU data path and translation look aside buffer are illustrated by FIG. 4a and FIG. 4b. Referring to the simplified block diagram of FIG. 4a, the MMU data path is mainly composed of multiplexors and registers associated with the virtual and physical addresses for a given operation. More particularly, the MMU data path contains a multiplexed structure which determines the physical address to be translated from the virtual address. Sources for translated addresses to the MMU typically come from six possible locations, such as instruction of virtual addresses, data virtual addresses, I/O DVMA address, write buffer addresses and the current physical address for table walks. In the present discussion, as shown, data virtual addresses are received in the data virtual address register (dvar) 353 and instruction virtual addresses are received into the instruction virtual address register (ivar) 357. The virtual address from register 353 or 357 as well as the context of the access as stored in the context register (CXR) 359, are combined with protection information (not shown) to form a virtual tag 363 for the virtual address to be translated.

In the present discussion, the focus will be on the instruction virtual addresses and data virtual addresses. An input address may be sent to the TLB input or bypassed around the TLB 350 directly to the physical address register (PAR) 370. An exemplary embodiment of a TLB structure is shown in FIG. 4b. The TLB 350 is preferably composed of a CAM (Content Address Memory) 360 structure that stores virtually tagged physical address translation information, such as tags for physical addresses, PTEs and PTPs. The TLB 350 also includes a select mechanism 373, which selects a corresponding PTP during a table walk, and page tables 361 in a memory portion of the TLB, such as an SRAM. As shown in FIG. 4b, it should be noted that the TLB 350 generates a number of other signals for control of accesses, such as the buffer miss (miss), access permitted (acc-ok), error (error) and modify miss (m_miss) signals. For example, the modify miss signal indicates that the memory is to be updated to set the modify bit to be consistent with the TLB. Furthermore, the select function 373 receives as input address bits (addr[5:0]), select (asel) and flush (flush) signals. The address bits provide the address for a write operation to the TLB, the address select signal selects the address to be input and the flush signal indicates whether a flush operation is to be performed.

Figure 5:
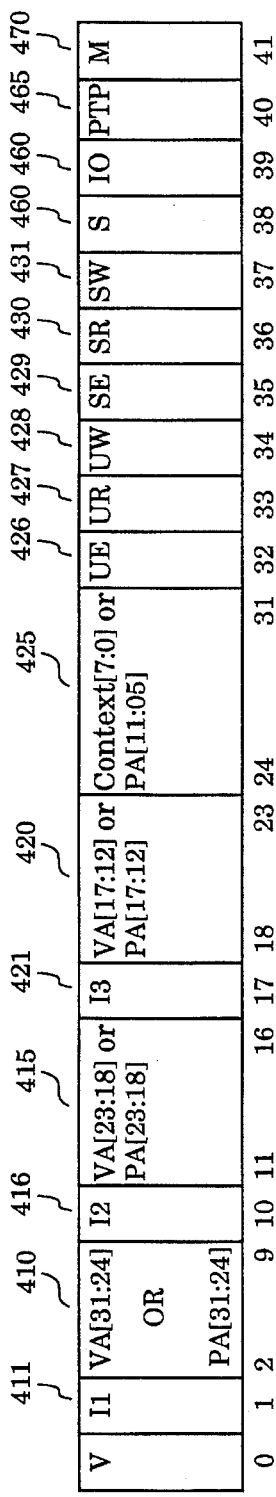
FIG. 5 is an illustration of an exemplary TLB tag layout.

An example of a tag found in the CAM 360 is shown in FIG. 5. Each entry has three address comparison fields with overrides 410, 415, 420 and a context field 425. It should be noted that if the tag is for a PTP, other than a virtual PTP tag, the address fields will be physical address fields, otherwise, virtual address fields are used. The tag also includes level bits 411, 416, 421 to indicate the level of page table if the tag is for a PTP. Each entry also has protection fields UE 426, UR 427, UW 428 and SE 429, SR 430 and SW 431, to indicate user read, write, execute and system read, write, execute privileges for the page. Bits are also allocated to indicate a supervisor page, 455 that the entry is for an I/O page (I/O) 460, when the entry is a page table pointer 465, or the entry is to a page that has been modified 470. Each address compare field preferably has a comparator associated with it. This comparator compares the tag input against what is currently stored in the CAM entry. If the fields are the same, the comparator signals a match. Therefore, if a match is found between a CAM entry and the tag input based upon the virtual address, then a TLB hit occurs and the PTE for that virtual address is immediately accessed in order to generate the corresponding physical address. If a TLB miss occurs, wherein a matching CAM entry is not found, then a table walk is performed to find the PTE. As noted earlier, tags for the PTPs based upon a physical address are also included in the CAM. Therefore, a table walk is performed through each level of page tables until the PTE is found. If the PTP for a virtual address are not found in the tables, that is, the corresponding tags generated are not found in the CAM, a memory read and a TLB write are performed to update the CAM and RAM with the necessary information. Furthermore, in accordance with the teachings of the present invention, the CAM includes the virtual tags for certain PTPs for direct access of those PTPs without the need to perform a complete table walk.

Figure 6:
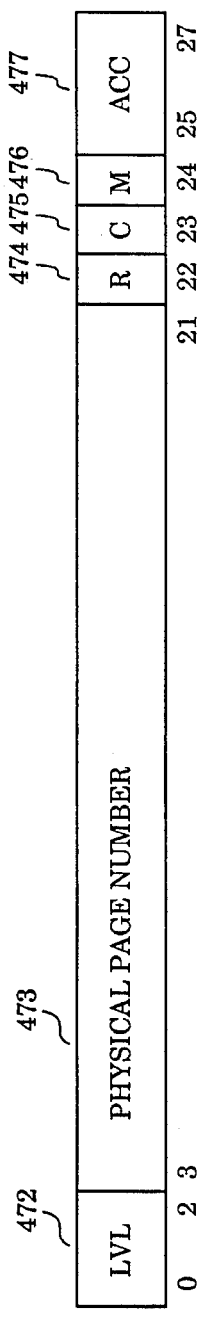
FIG. 6 is an illustration of a page table entry layout.
Figure 7:
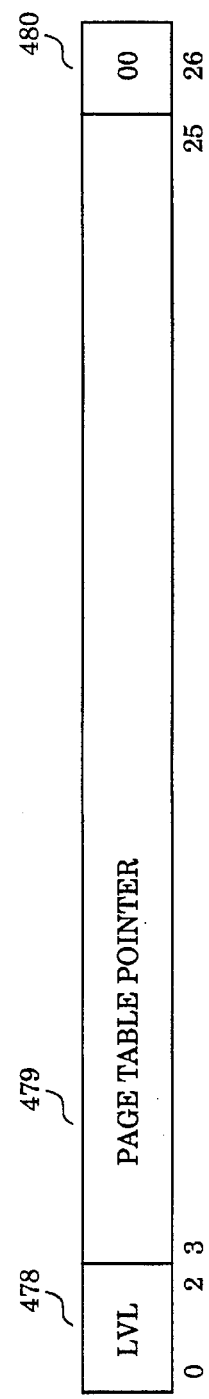
FIG. 7 is an illustration of a page table pointer layout.

The TLB RAM 361 is an array that holds the translation information tagged by a corresponding CAM entry. Each 28-bit field in the RAM is broken up into the page number and its associated access privilege (ACC) field, which is preferably an encoded version of the protection fields found in the CAM tags, cacheable bit, modified bit, and 3 bits of level information. If the entry is a page table pointer, the RAM contains only the upper physical base address of the next level of the table. In particular, referring to FIG. 6, in the present embodiment, a PTE includes level bits 472, physical page number 473, a reserved bit 474, cacheable bit 475, modify bit 476 and access bits 477. Referring to FIG. 7, a PTP in the present embodiment includes level bits 478, page table pointer 479, and unused bits 480. FIG. 6 is an exemplary page table entry layout and which resides in the TLB RAM and FIG. 7 is an illustrative page table pointer layout in the TLB RAM.

The operation of the TLB and the registers in the MMU data path are controlled by the MMU control mechanism which is preferably a plurality of state machines to control the MMU operation. Of particular note with respect to the present invention is a table walk state machine which implements the virtual address to physical address translation process in accordance with the teachings of the present invention. When the MMU is required to translate a virtual address to a physical address, the MMU will first look into the CAM for translation. If the required translation is not in the CAM (that is, a TLB miss occurs) the MMU initiates the table walk state machine to perform a table walk. The table walk process accesses the necessary information in the different levels of the page table to translate a given virtual address into the appropriate physical address and places the translation information in the TLB for use by the MMU. In addition to the basic translation mechanism, the state machine supports the flush and probe functions for the MMU.

Figure 8:
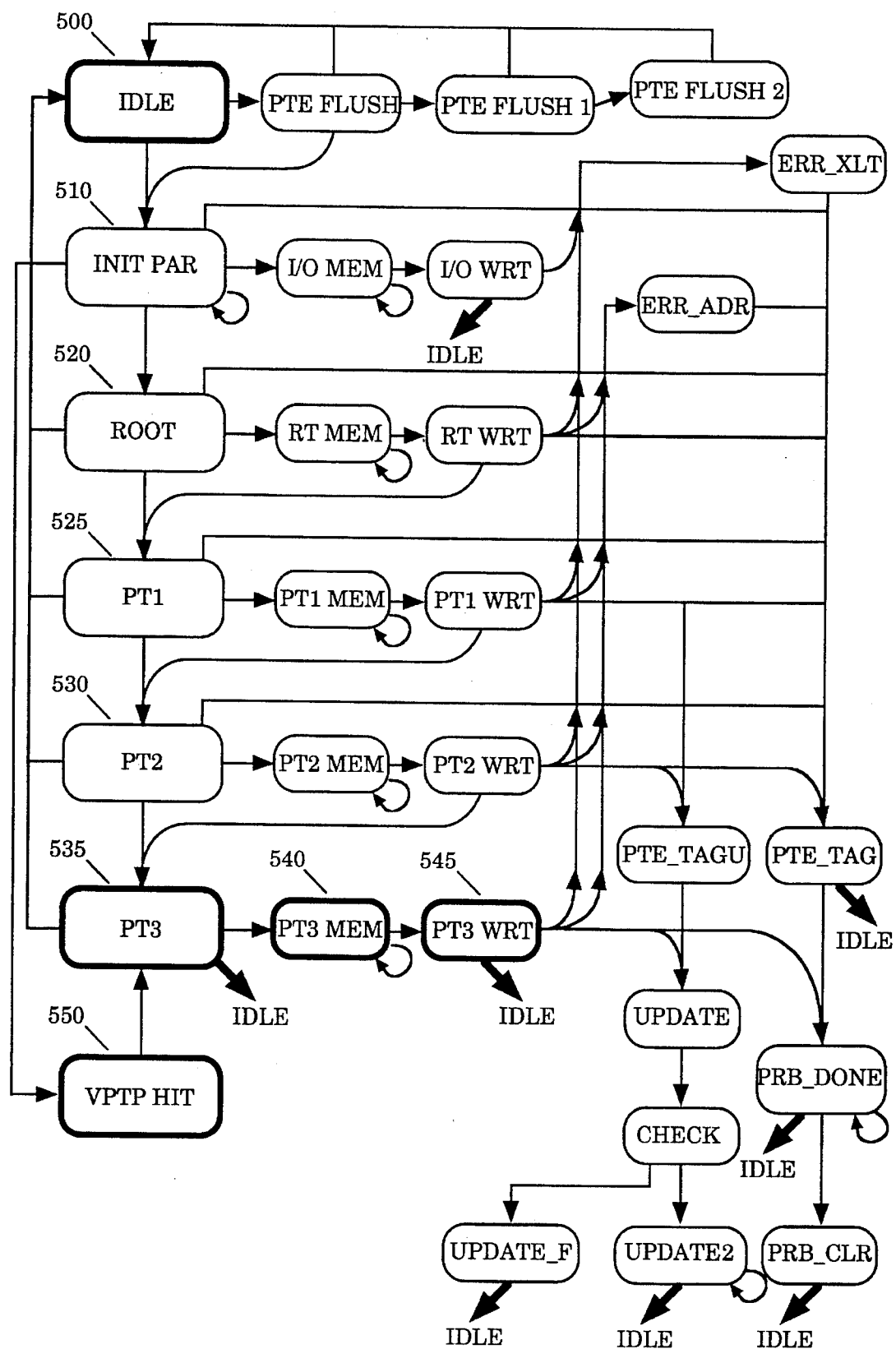
FIG. 8 is a state diagram illustrating a table walk that is performed through a virtual page table pointer hit in accordance with the teachings of the present invention.

The state diagram illustrating an exemplary operation of the table walk state machine, in accordance with the teachings of the present invention, is shown in FIG. 8. If during a TLB look-up a miss occurs due to none of the TLB tags found in the content addressable memory matching the current virtual address tag, then a table walk is performed. Upon receipt of a TLB miss signal, the state machine exists the idle state 500 and enters the INIT_PAR state, which loads the physical address register (PAR) from the CTPR and CXR. Next, the root state 520 is entered which checks the TLB for an entry with a physical tag matching the PAR. This entry is found and the PAR is loaded from the TLB data and the table walk state machine branches to the PT1 state 525. At the PT1 state, the TLB is again accessed.

For a level one page table pointer (based on the contents of the PAR) the PAR is loaded with the data from the PT1 look-up and the corresponding index from the virtual address and this is used for a level two PTP look-up in state PT2 530. This entry is also found and the PAR is again loaded with the PTP data from the TLB at state PT3 535. At state PT3_MEM, a memory request to read the level 3 PTE is issued based on the fact that level 3 is the last level of the table walk. PT3_WRT state updates the TLB with the page table entry and the corresponding virtual address tag.

The above process described assumes that page table pointers are found in the level one and level two page tables. If page table entries are found in level one or level two page tables, the state machine correspondingly branches to the corresponding read and write states for update of the TLB. In accordance with the teachings of the present invention, virtual tags for PTPs in a determined higher level of the table containing PTPs, in the present example, level two of the page table, are also provided for rapid access of the page table pointer at that higher level and subsequent access of the corresponding page table entry.

At state $INIT_{13}PAR$ 510, continuing with the present example, while performing a load of PAR from the CTPR and CXR, a virtual tag is generated for the level two PTP, based upon the first and second index fields of the virtual address and the context, as provided in tile context register (CXR). This unique tag generated is then used to index the second level of the page table to determine if a match occurs. If a match occurs for that entry, state VPTPHIT 550, the information provided is the index to level three of the page table, which contains the page table entry for that virtual address. Thus, a substantial time savings is achieved by eliminating the time required to table walk through the root, first and second levels of the page table.

It is to be understood that an entry will exist only if the page table entry was previously accessed through a table walk. If a table walk had not been previously performed, one would be performed at that time to generate the corresponding page table pointers and page table entries in the different level page tables. However, in view of locality of data accesses, significant advantages are achieved due to the likelihood of locality of accesses to the same pages. Thus, by uniquely indexing the page table pointer in a higher level of the page table with the context and the indices of the virtual address for the lower levels of the page table, in the present example, the second and third indices of the virtual address, a virtual page table pointer tag is generated to directly index a higher level of the page table, thereby avoiding table walking through the lower levels of the page table.

Figure 9:
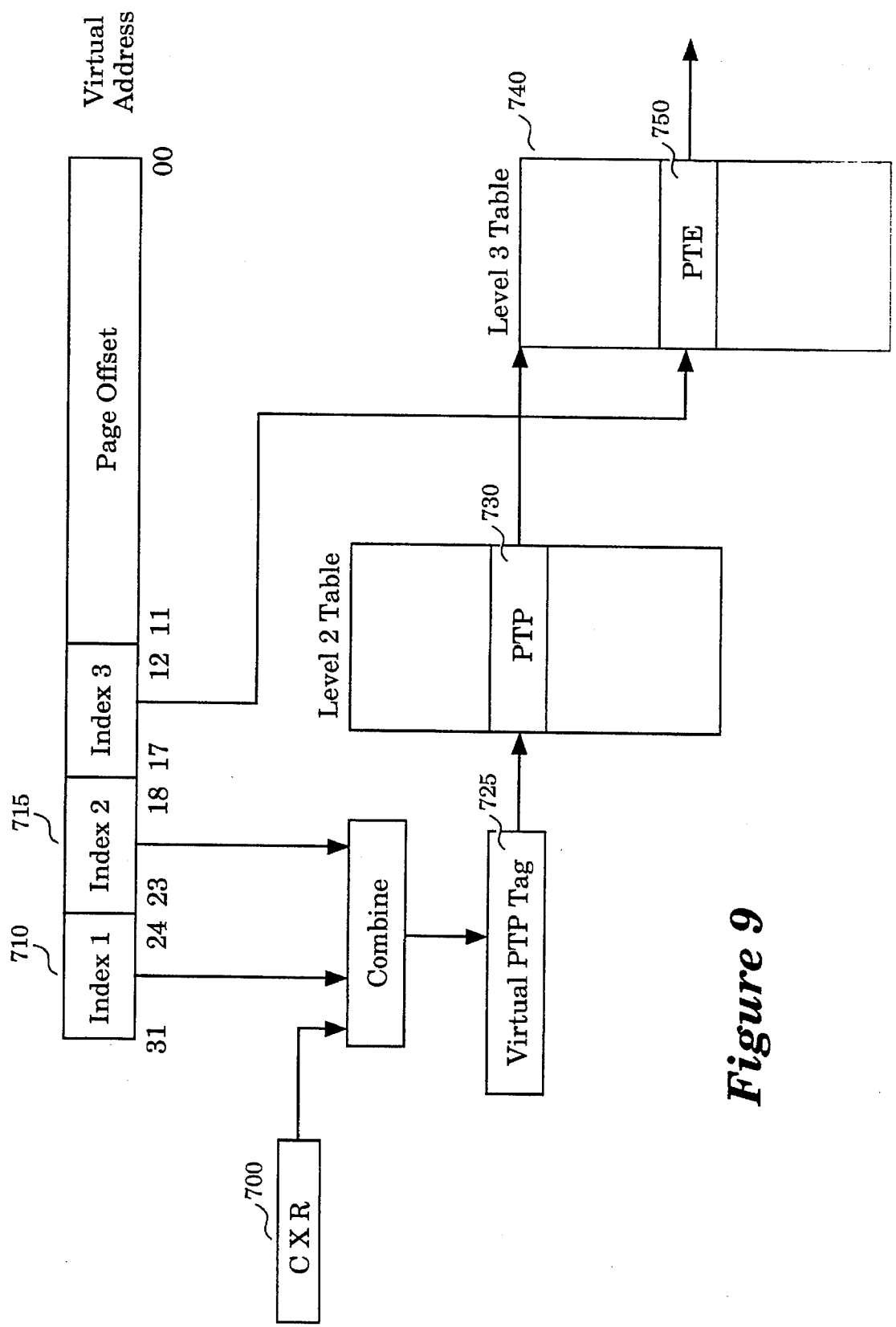
FIG. 9 is a diagram illustrating address translation using the virtual tagged PTPs in accordance with the teachings of the present invention.

FIG. 9 illustrates the process of using the virtual page table pointer tag to decrease the amount of time required to perform a table walk. The context that is stored in the CXR register 700 is combined with the fields 710, 715 of the virtual address containing the first two index fields, to produce a virtual page table pointer tag 725. Preferably, the tag is the concatenation of the first level index, second level index and context fields. This corresponds to virtual tags found in the CAM and points to an entry in the level two table if a hit occurs. If a hit does not occur, then a table walk is performed, starting with the context or root level of the table. Otherwise, if a hit occurs, that page table pointer found 730 points to the level three of the table 740 and the third field containing the third index is used to point to the page table entry 750, which is used to access the physical address.

The invention has been described in conjunction with the preferred embodiment. It is evident that numerous alternatives, modifications, variations and uses will be apparent to those skilled the art in light of the foregoing description.

What is claimed is:

1. In a computer system comprising a processor and memory, wherein accesses to memory are performed by issuing a virtual address to memory, an apparatus for performing a translation from a virtual address to a physical address comprising:

a translation look aside buffer comprising;
  a page table memory comprising a plurality of levels of a page table, an initial level of the page table being identified as a root level, said page table memory storing page table pointers (PTPs) which provide a base address of a table in a next higher level of a page table and page table entries (PTEs) which provide information to translate the virtual address to the physical address;
  a tag memory comprising tags, said tags comprising identification of PTEs and PTPs, said tags further comprising virtual PTP tags for PTPs located in at least one predetermined higher level that is higher than the root level, said tags providing a pointer to a corresponding entry in the page table;
  a select mechanism coupled to receive the virtual address and context of the memory access, said select mechanism generating a compare virtual PTP tag if a TLB miss occurs when trying to access a tag identifying a PTE corresponding to the virtual address, said compare virtual PTP tag generated from the context of the memory address and a predetermined portion of the virtual address, said compare virtual PTP tag compared to stored virtual PTP tags stored in the tag memory such that if the compared virtual PTP tag and one of the stored virtual PTP tags match, the select mechanism provides a pointer to the corresponding PTP at the predetermined higher level of the page table without performing a page table walk initiating at the root level through the lower level page tables;
  wherein the time expended for performing a page table walk is minimized.

2. The computer system as set forth in claim 1, wherein virtual PTP tags identify PTPs in one higher level.

3. The computer system as set forth in claim 2, wherein virtual PTP tags identify PTPs in a lower level next to the highest level of the page table.

4. The computer system as set forth in claim 1, wherein the page table comprises a root, first, second and third levels, PTEs are stored at least in the third level of the page table, and PTPs are stored in the root, first, second and third levels of the page table, said predetermined higher level being the second level of the page table, such that if a match of any one of the stored virtual PTP tags and compare virtual PTP tags occurs, a table walk through the root, first and second levels to identify the PTP in the second level is avoided.

5. The computer system as set forth in claim 1, wherein the virtual address comprises a plurality of index fields, each index field providing an index to an entry in a corresponding level of the page table, said virtual PTP tag generated from the context and index fields corresponding to the lower levels of the page tables and the predetermined higher level of the page table.

6. The computer system as set forth in claim 5, wherein the virtual PTP tag for a PTP in the second level is generated from the context and a first and second index field corresponding respectively to the first and second levels of the page table.

7. In a computer system comprising a processor and memory, wherein accesses to memory are performed by issuing a virtual address to memory, an apparatus for performing a translation from a virtual address to a physical address comprising:

a memory management unit (MMU) comprising a data path for receiving a context of a memory access and a virtual address and outputting a physical address to access memory and a controller for controlling translation of virtual addresses to physical addresses; a translation look aside buffer comprising;

a page table memory comprising a plurality of levels of a page table, an initial level of the page table being identified as a root level, said page table memory storing page table pointers (PTPs) which provide a base address of a table in a next higher level of a page table and page table entries (PTEs) which provide information to translate the virtual address to the physical address; and a tag memory comprising tags identifying PTEs and PTPs, said tags identifying a table comprising virtual PTP tags for PTPs located in at least one predetermined higher level that is higher than the root level, said tags providing a pointer to a corresponding entry in the page table;

said MMU controller generating a compare virtual PTP tag if a TLB miss occurs when to access a tag identifying a PTE corresponding to the virtual address, said compare virtual PTP tag generated from the context of the memory address and a predetermined portion of the virtual address and the content of the memory address where the miss occurred, said compare virtual PTP tag compared to stored virtual PTP tags stored in the tag memory such that if the compared virtual PTP tag and one of the stored virtual PTP tags match, said controller providing a pointer to the corresponding PTP at the predetermined higher level of the page table without performing a page table walk initiating at the root level through the lower level page tables;

wherein the time expended for performing a page table walk is minimized.

8. The computer system as set forth in claim 7, wherein virtual PTP tags identify PTPs in one higher level.

9. The computer system as set forth in claim 8, wherein virtual PTP tags identify PTPs in a lower level next to the highest level of the page table.

10. The computer system as set forth in claim 7, wherein the page table comprises a root, first, second and third levels, PTEs are stored at least in the third level of the page table, and PTPs are stored in the root, first, second and third levels of the page table, said predetermined higher level being the second level of the page table, such that if a match of any one of the stored virtual PTP tags and compared virtual PTP tags occurs, a table walk through the root, first and second levels to identify the PTP in the second level is avoided.

11. The computer system as set forth in claim 7, wherein the virtual address comprises a plurality of index fields, each index field providing an index to an entry in a corresponding level of the page table, said virtual PTP tag generated from the context and index fields corresponding to the lower levels of the page tables and the predetermined higher level of the page table.

12. The computer system as set forth in claim 11, wherein the virtual PTP tag for a PTP in the second level is generated from the context and a first second index field corresponding respectively to the first and second levels of the page table.

13. In a computer system comprising a processor and memory, wherein accesses to memory are performed by issuing a virtual address to memory, said system further comprising a translation look aside buffer comprising a tag memory and a page table memory, said page table memory comprising a plurality of levels of a page table, an initial level of the page table being identified as a root level, said page table memory storing page table pointers (PTPs) which provide a base address of a table in a next higher level of a page table and page table entries (PTEs) which provide information to translate the virtual address to the physical address, said tag memory comprising tags identifying PTEs and PTPs, a method for performing a translation from a virtual address to a physical address comprising the steps of:

storing virtual PTP tags for PTPs located in at least one predetermined higher level higher than the root level, said tags providing a pointer to a corresponding entry in the page table; and if a TLB miss occurs when trying to access a tag identifying a PTE corresponding to the virtual address;

generating a compare virtual PTP tag, said compare virtual PTP tag generated from the context of the memory address and a predetermined portion of the virtual address and the content of the memory address where the miss occurred, comparing said compare virtual PTP tag to the stored virtual PTP tags stored in the tag memory, and if the compared virtual PTP tag and one of the stored virtual PTP tags match, providing a pointer to the corresponding PTP at the predetermined higher level of the page table without performing a page table walk initiated at the root level through the lower level page tables;

wherein the time expended for performing a page table walk is minimized.

14. The method as set forth in claim 13, wherein virtual PTP tags identify PTPs in one higher level.

15. The method as set forth in claim 14, wherein virtual PTP tags identify PTPs in a lower level next to the highest level of the page table.

16. The method as set forth in claim 13, wherein the page table comprises a root, first, second and third levels, PTEs are stored at least in the third level of the page table, and PTPs are stored in the root, first, second and third levels of the page table, said predetermined higher level being the second level of the page table, such that if a match of any one of the stored virtual PTP tags and compared virtual PTP tags occurs, a table walk through the root, first and second levels to identify the PTP in the second level is avoided.

17. The method as set forth in claim 13, wherein the virtual address comprises a plurality of index fields, each index field providing an index to an entry in a corresponding level of the page table, said step of generating a virtual PTP tag comprising the step of generating the tag from the context and index fields corresponding to the lower levels of the page tables and the predetermined level of the page table.

18. The computer system as set forth in claim 17, wherein the virtual PTP tag for a PTP in the second level is generated from the context and a first and second index field corresponding respectively to the first and second levels of the page table.

* * * * *